(12) United States Patent
Hicks et al.

(10) Patent No.: US 7,468,203 B2
(45) Date of Patent: *Dec. 23, 2008

(54) TEXTURED WINDOW FILM

(75) Inventors: Thomas Hicks, Portland, OR (US);
Michael John Kyne, Lake Forest, CA (US)

(73) Assignee: Artscape, Inc., Portland, OR (US)

( * ) Notice: Subject to any disclaimer, the term of this patent is extended or adjusted under 35 U.S.C. 154(b) by 111 days.

This patent is subject to a terminal disclaimer.

(21) Appl. No.: 10/846,904

(22) Filed: May 13, 2004

(65) Prior Publication Data

US 2005/0255292 A1 Nov. 17, 2005

(51) Int. Cl.
*B32B 3/14* (2006.01)
*G02B 5/04* (2006.01)

(52) U.S. Cl. .................. 428/141; 428/156; 428/161; 359/599; 359/615; 427/163.1

(58) Field of Classification Search ............... 428/141, 428/161, 156; 359/599, 615; 427/163.1
See application file for complete search history.

(56) References Cited

U.S. PATENT DOCUMENTS

| | | |
|---|---|---|
| 3,515,619 A | 6/1970 | Barnette |
| 3,562,941 A | 2/1971 | Boden |
| 3,815,263 A | 6/1974 | Oberwager |
| 3,931,425 A | 1/1976 | Kuroda |
| 4,070,259 A | 1/1978 | De Poortere et al. |
| 4,070,781 A | 1/1978 | Sauer |
| 4,078,492 A | 3/1978 | Levy et al. |
| 4,127,689 A | 11/1978 | Holt |
| 4,225,369 A | 9/1980 | Felchlin |
| 4,231,634 A | 11/1980 | Gantz et al. |
| 4,283,451 A | 8/1981 | Abrahami |
| 4,312,688 A | 1/1982 | Brodis et al. |
| 4,320,174 A | 3/1982 | Rabinovitch et al. |
| 4,528,232 A | 7/1985 | Cliffe |
| 4,684,675 A | 8/1987 | Collier |
| 4,791,745 A | 12/1988 | Pohn |
| 4,863,782 A | 9/1989 | Wang et al. |
| 5,021,278 A | 6/1991 | Short |
| 5,144,328 A | 9/1992 | Blake et al. |
| 5,202,180 A | 4/1993 | Watts |
| 5,217,791 A | 6/1993 | Fujita et al. |
| 5,258,214 A | 11/1993 | Cooledge et al. |
| 5,273,796 A | 12/1993 | Elbing et al. |
| 5,577,947 A * | 11/1996 | Malloy et al. ............... 446/220 |

(Continued)

FOREIGN PATENT DOCUMENTS

GB 2324381 A 10/1998

OTHER PUBLICATIONS

"Borders for Kids" advertisement, 1996.

(Continued)

*Primary Examiner*—William P Watkins, III
(74) *Attorney, Agent, or Firm*—Stolowitz Ford Cowger LLP

(57) ABSTRACT

A textured window film has a prismatic effect that allows a substantial amount of incoming light to pass through a window while refracting the light at random or semi-random angles in a manner that distorts viewed images. The result is a window film that is brighter and more vibrant while also providing visual privacy. The textured window film can therefore better simulate real textured and colored glass.

12 Claims, 8 Drawing Sheets

U.S. PATENT DOCUMENTS

| | | | |
|---|---|---|---|
| 5,594,191 A | 1/1997 | Epstein et al. | |
| 5,617,790 A | 4/1997 | Chmielnik | |
| 5,672,413 A | 9/1997 | Taylor et al. | |
| 5,707,684 A * | 1/1998 | Hayes et al. | 427/162 |
| 5,829,789 A | 11/1998 | Treleaven et al. | |
| 5,871,571 A | 2/1999 | Rendall et al. | |
| 5,887,393 A | 3/1999 | Vanark et al. | |
| 5,916,450 A | 6/1999 | Muggli et al. | |
| 5,940,215 A * | 8/1999 | Rudisill et al. | 359/599 |
| 6,030,002 A | 2/2000 | Charley et al. | |
| 6,054,208 A | 4/2000 | Rega et al. | |
| 6,231,183 B1 | 5/2001 | Dillon | |
| 6,358,598 B1 * | 3/2002 | Hicks | 428/203 |
| 6,721,102 B2 * | 4/2004 | Bourdelais et al. | 359/628 |
| 6,900,941 B2 * | 5/2005 | Kaminsky et al. | 359/599 |
| 6,997,566 B2 * | 2/2006 | Hannington | 359/614 |
| 2002/0039632 A1 * | 4/2002 | Hicks | 428/38 |
| 2003/0108724 A1 * | 6/2003 | Hicks | 428/195 |
| 2004/0213974 A1 * | 10/2004 | Hicks et al. | 428/216 |

OTHER PUBLICATIONS

"Development Timeline", Tom Hick, 1996-1999.

"EtchArt, Inc." advertisement, date unknown (admitted prior art—date on facsimile copy Jul. 12, 1999).

"Self-clinging vinyl blocks harmful UV rays", undated advertisement for Solar Stat self-adhering vinyl film product (Silvohome Product—admitted pri r art).

Sixteen (16) sheets of digitial photographs showing Artscape's Versailles decorative window film. At least as early as 2002.

* cited by examiner (BACKGROUND)

(BACKGROUND)

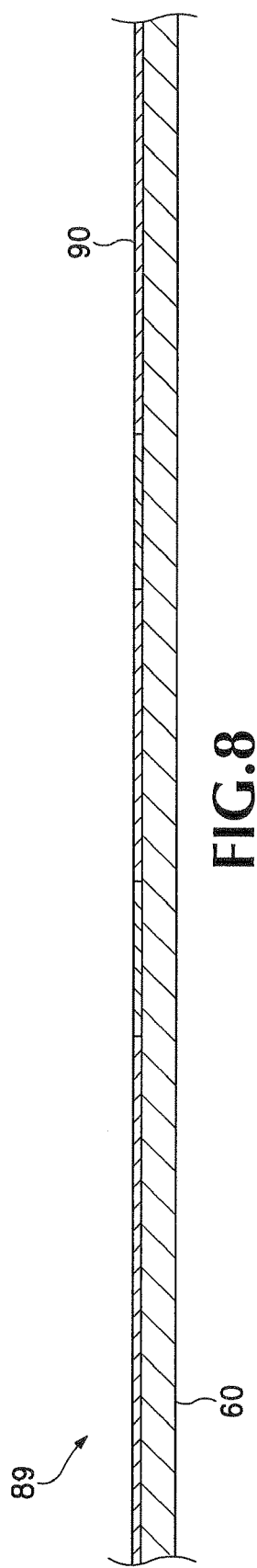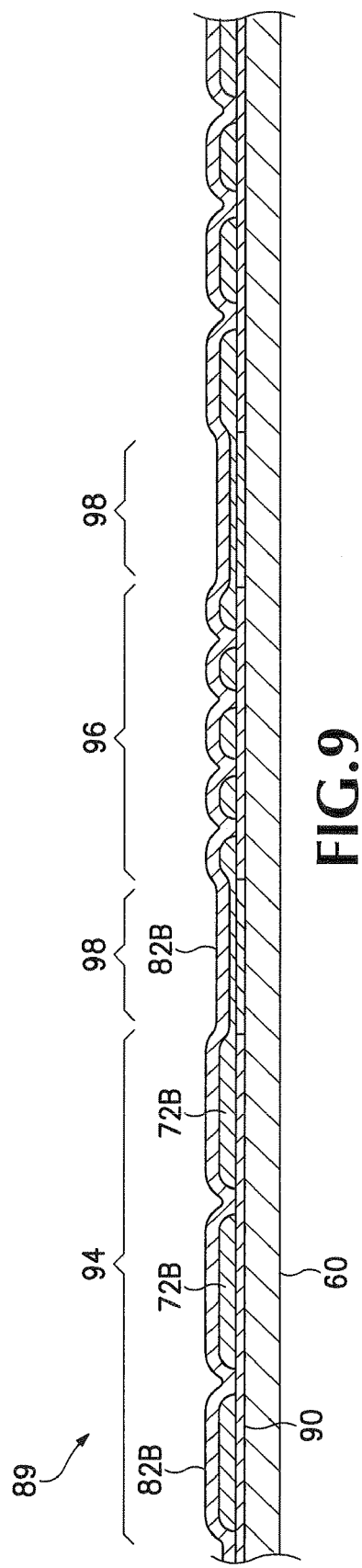

TEXTURED WINDOW FILM

BACKGROUND OF THE INVENTION

This invention relates generally to textured window films.

There are many styles of real textured glass. Real textured glass can include cathedral glass, pot metal glass, architectural glass, hand wrought glass, rolled glass, or any other type of glass that may be modified or manufactured in some way, typically while in a molten state, to produce some sort of textured effect or altered visual impression. Different examples of textured glass styles include pebbled, waved, water glass, etc. The textured surface of the glass provides privacy by distorting images that may be viewed from an opposite side of the window while at the same time allowing a substantial amount of light to pass through the window.

Some real textured glass also provides an additional aesthetic appeal with the use of particular textured shapes and colors. For example, stained glass which comes in a broad range of colors that provide the privacy of textured glass while letting some amount of light to pass through the stained glass window. The stained glass also provides an aesthetic appeal with different combinations of glass colors and glass shapes. However, clear and colored textured glass windows and stained glass windows are expensive to manufacture and install.

Window films are applied to windows to provide privacy. However, current window films do not provide the same visual characteristics provided by real textured glass. Current window films provide privacy by blocking or diffusing a substantial amount of incoming light. For example, current window films may use a cloudy grey or other opaque material that both diffuses and reflects the incoming light.

Unfortunately, these diffusion and reflection characteristics reduce the amount of light that can pass through the window and causes the surface of the window to appear dull and grey. Different colored designs may be printed onto the window film. These light diffusion and reflection characteristics tend to dull the colors and designs applied to the window film further reducing the aesthetic appeal of the window.

In contrast, real textured windows provide privacy by refracting light which distorts images viewed from an opposite side of the window. These refraction characteristics of real textured glass produce a brighter more sparkling window surface that has an increased aesthetic appeal over current window films. One analogy is that the window film provides visual characteristics similar to a light grey plastic cup while real textured glass provides a vibrant visual characteristic more like a crystal glass.

Window films can also be difficult to install. Window films typically use an adhesive on one side to attach to the window. During installation, these adhesive surfaces can stick to each other. This requires the two contacting surfaces to be forcibly pulled apart which can then damage the film surface, for example, by creating cracks, creases or stretch marks. The adhesive surface also prevents the window film from being easily removed or repositioned on the window.

Current window films are very thin increasing the possibility that the adhesive surfaces of the film will bend over and attached onto itself causing more installation problems and also increasing the possibility that the film will be damaged. The thinness and composition of these window films also increase the possibly that the film with retain creases or crack during installation. For example, conventional polyester window films are around 1.0 thousands of an inch (mils) thick.

The present invention addresses this and other problems associated with the prior art.

BRIEF DESCRIPTION OF THE DRAWINGS

FIGS. 8 and 9 show screen printing stages used for a colored textured window film.

DESCRIPTION OF THE PREFERRED EMBODIMENTS

A textured window film provides a prismatic effect that allows a substantial amount of incoming light to pass through a window while refracting the light at random or semi-random angles in a manner that distorts viewed images. The result is a window film that produces a brighter more vibrant visual image while also providing visual privacy. In other words, the textured window film simulates the visual effects provided by real textured and colored glass.

Figure 1:
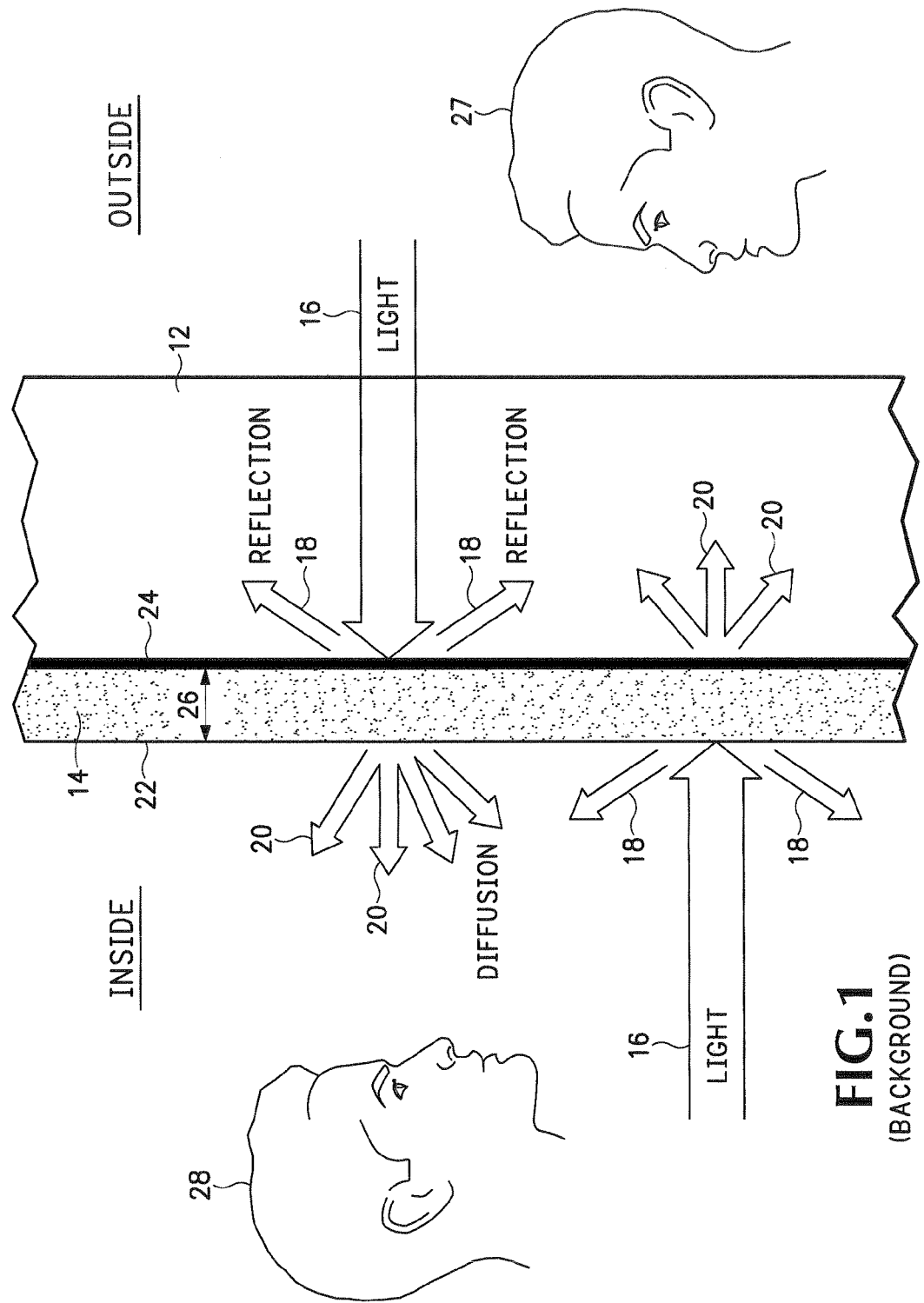
FIG. 1 is a side section view of a conventional window film that diffuses and reflects incoming light.

FIG. 1 shows a conventional window film 14 attached to a window 12. The conventional window film 14 has a flat window contact surface 24, a flat outside surface 22, and a substantially uniform thickness 26. The window film 14 must have a sufficient opaqueness and light diffusion characteristic in order to provide adequate privacy when a person 27 looks through the window 12. The opaqueness of the window film 14 reflects and diffuses light so that person 27 cannot clearly see inside the window 12.

However, this opaque characteristic of window film 14 also cause light 16 to reflect backwards preventing a substantial amount of reflected light 18 from passing through film 14. Any light 20 that does pass through sheet 14 is heavily diffused. Thus the interior of the room will be darker and the surface of the window 12 in many cases will be a dull grey color.

Figure 2:
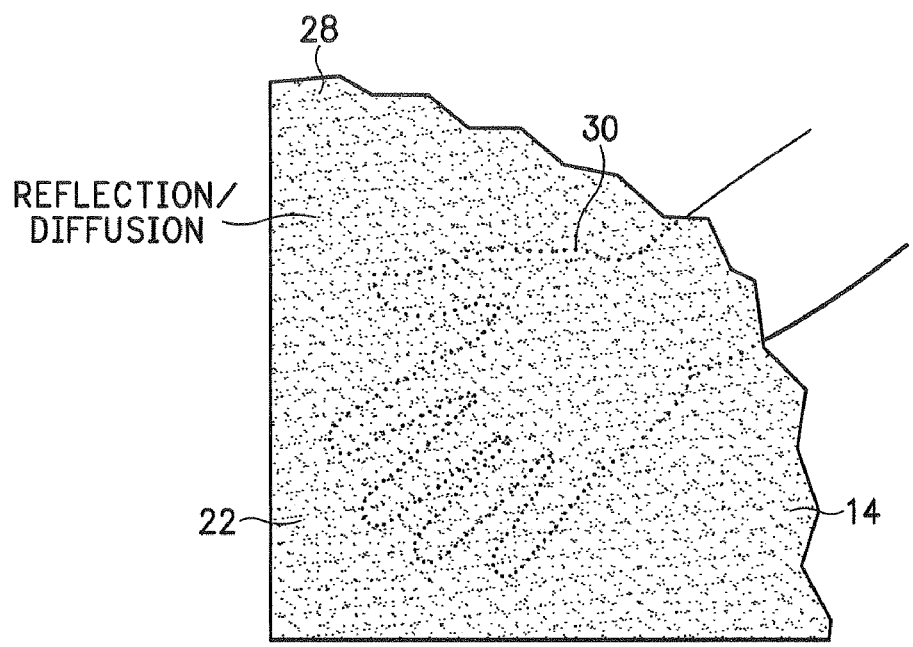
FIG. 2 is a diagram showing how the conventional window film dulls the surface of a window.

FIG. 2 represents the visual effects created by the conventional window film 14. As shown above, in order to provide the desired amount of privacy, the window film 14 has an opaqueness that reflects a substantial amount of light 18 (FIG. 1) and diffuses light 20 (FIG. 1) that passes through the window. These reflection and diffusion characteristics create a generally dull grey visual effect 28 both on the outside surface 22 of film 14 and dulls any images 30 that are viewed through window 12.

Example Embodiments of the Invention

Figure 3A:
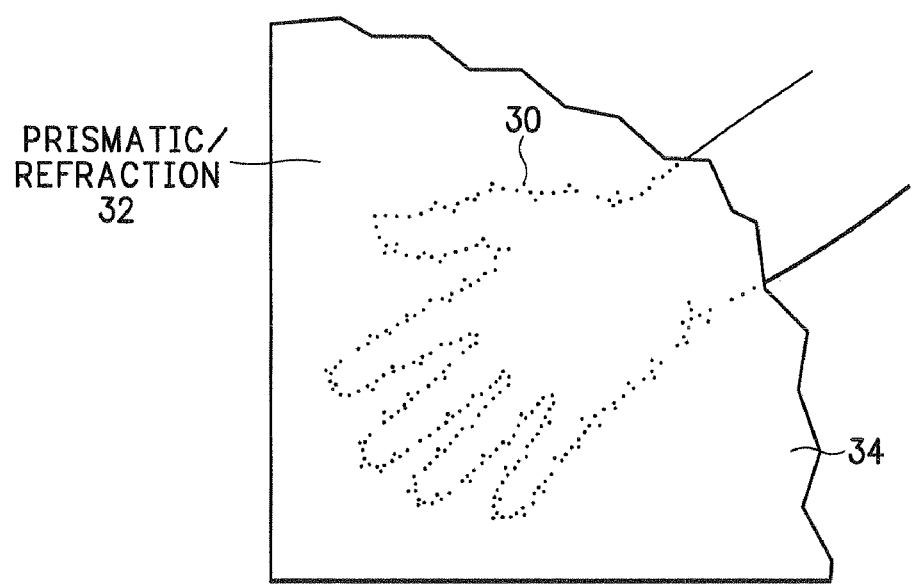
FIGS. 3A and 3B are diagrams showing how a textured window film according to one embodiment of the invention can distort an image while maintaining a bright window surface.
Figure 3B:
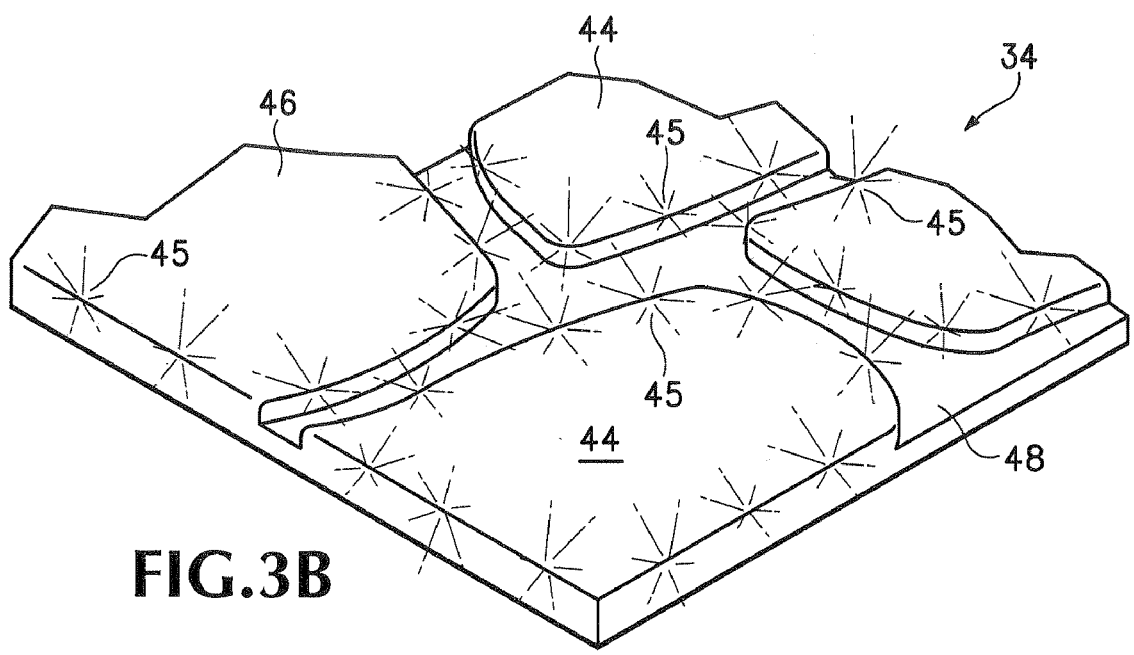

FIGS. 3A and 3B show a prismatic effect 32 created by a textured window film 34 according to one embodiment of the invention. The prismatic effect 32 created by window film 34 allows a significant amount of light to pass through the attached window and film 34. This produces a brighter, more vibrant, and sparkling film surface than the dull surface 22 produced by the window film 14 shown in FIG. 2. For example, light is refracted at different angles off the different contoured surfaces of the textured areas 44 and 46 in FIG. 3B creating the different sparkling effects 45. In addition, there may be some flat areas 48 that allow some limited amount of additional less refracted light to pass through the textured window film 34.

However, a substantial amount of the light that passes through the textured window film 34 is refracted or bent distorting any viewed images. The result is the sparkling visual effect shown in FIGS. 3A and 3B that also maintains a required level of privacy. The textured surface 38 also has the added advantage of making any color or colored pattern that is applied to the window film 34 more vibrant than is possible using the window film 14 shown in FIG. 1.

The textured window film 34 produces a visual effect that more accurately simulates the visual effects created by actual textured glass. However, these simulated visual effects are produced at a fraction of the cost of real textured or colored glass. The textured window film 34 can be applied to any glass surface and is particularly applicable to windows in homes or offices where someone wishes to have some degree of privacy from others looking through the window. Because more light passes through the window, the textured window film 34 provides a brighter more pleasing environment inside the home or building.

Figure 4:
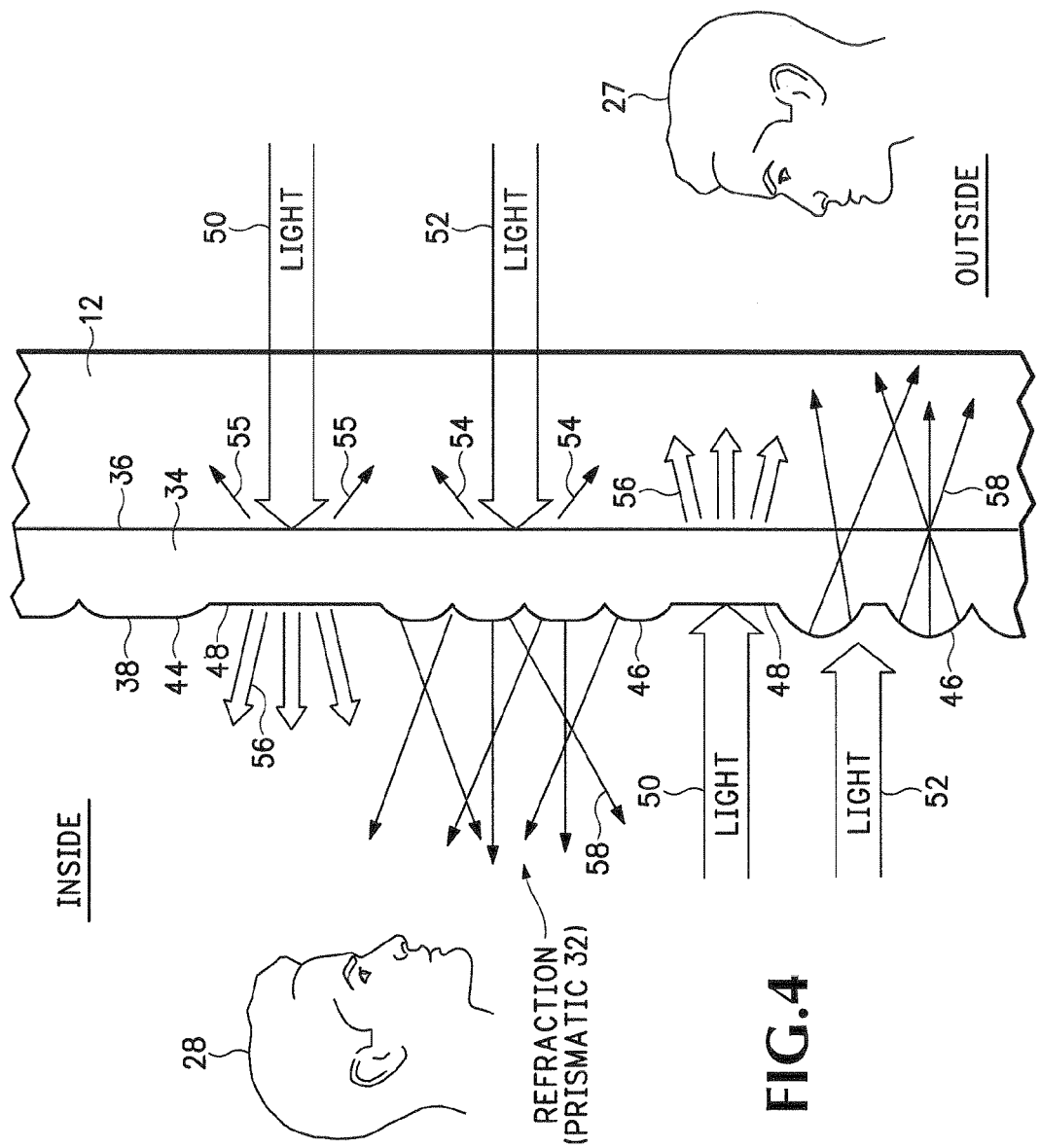
FIG. 4 is an enlarged schematic side section view of the textured window film shown in FIG. 3.

FIG. 4 shows the textured window film 34 in more detail. In one example, an outside surface 38 is textured and an inside window contact surface 36 is substantially flat and smooth so that it can be easily attached to the window 12. In one example, the inside surface 36 is held on the window by cohesion and atmospheric pressure without having to use adhesives. However, this is only one example, and it is also possible to use an adhesive on inside surface 36 to attach the textured window film 34 to window 12.

The textured surface 38 produces the prismatic effect 32 described above in FIG. 3. Light 52 is refracted by the textured surface 38 in a random or semi-random manner that allows a substantial amount of light 58 to pass through both window 12 and window film 34. For example, the amount of light 54 reflected by the textured window film 34 is less than the amount of light 18 reflected by the window film 14 in FIG. 1. Thus, the textured window film 34 allows more light 56 and 58 to pass through the window 12 providing a brighter inside surface on the window 12.

A substantial amount of light coming from inside of window 12 is also refracted. The refracted light distorts images, such as image 28 or image 30 in FIG. 3, when viewed by a person 27 looking from the outside of window 12. This image distortion provides a sufficient amount of privacy without having to use opaque film materials, such as the window film 14 shown in FIGS. 1 and 2.

The textured surface 38 can include different combinations of textured areas 44 and 46 and substantially flat areas 48. The depth and shape of the textured areas 44 and 46 can be varied to create different visual effects. For example, the patterns of the textured areas can be varied to create different textured impressions. For instance, smaller bumps may be used for a more frosted look, while larger bumps may be used for a more pebbled textured look. In another implementation, the bumps may be aligned in rows or some other pattern to simulate flowing or ribbed glass textures or for other architectural design or aesthetic reasons.

In another example, some embodiments of the textured window film 34 may have little or no flat areas 48 while other embodiments may have a substantially larger proportion of flat areas 48. The flat areas 48 may only comprise a small portion of the entire outside textured surface 38. Therefore the flat areas 48 may not be required to provide the same distortion or privacy as the textured areas 44 and 46. The flat areas 48 allow light 50 to pass through with little or no refraction or reflection further increasing the brightness and vibrance of the window film 34.

The flat areas 48 in combination with the textured areas 44 and 46 can operate in a manner similar to window blinds. The textured areas 44 and 46 distort a substantial amount of any image 28 that may be viewed by person 27 from the outside of window 12. The amount of non-distorted light 56 that may pass through flat areas 48 is small enough to maintain the desired amount of privacy. For example, textured areas 44 and 46 operate in a manner analogous to slats in a window blind, while the flat areas 48 operate in a manner analogous to the spaces between the slats. Of course, light cannot pass through the slats in a window blind while the textured areas 44 and 46 allow light to pass through but in the prismatic refracted condition described above.

Multi-Layer Screen Process

One example uses a multi-layer screen printing process commonly known as screen printing for creating the textured window film 34. While a screen printing process is described below, it should be understood that any other screen or non-screen process can be used that produce a textured surface on a window film.

Screen printing is a method of print production where ink is forced through a mesh that is stretched across a frame similar to a screen on a window or door. The mesh can be fabric, synthetic, metal, or another other mesh material. A coating referred to as an emulsion is applied to the mesh that blocks out all areas except the image that is to be printed. Ink is flooded across the screen and forced through the open areas in the mesh with a squeegee. The printing process occurs when the squeegee is pulled across the screen transferring the ink through the open mesh areas onto a substrate.

Figure 5:
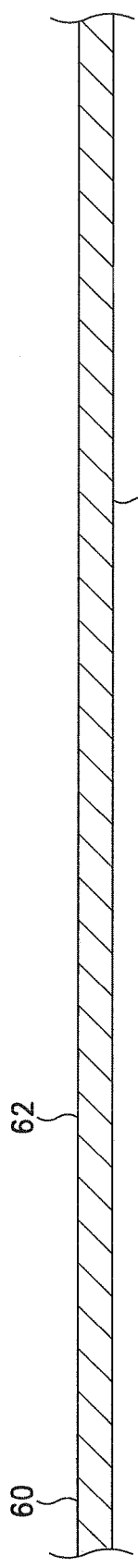
FIGS. 5, 6, and 7 show screen printing stages used for creating the textured window film.

FIG. 5 shows a polymeric film 60 used as a substrate for the screen printing process. The polymeric film 60 can be any type of translucent, transparent, or clear material that can be attached to a window. In one example, the polymeric film 60 is a polyvinyl material that attaches to a window using cohesion and atmospheric pressure. The polymeric film 60 can be any thickness but in one example is anywhere between 0.5 thousands of an inch (mils) and 10 mils. In embodiment, the polymeric film 60 is a transparent and in other embodiments the film 60 may be colored or have varying degrees of opaqueness.

Figure 6:
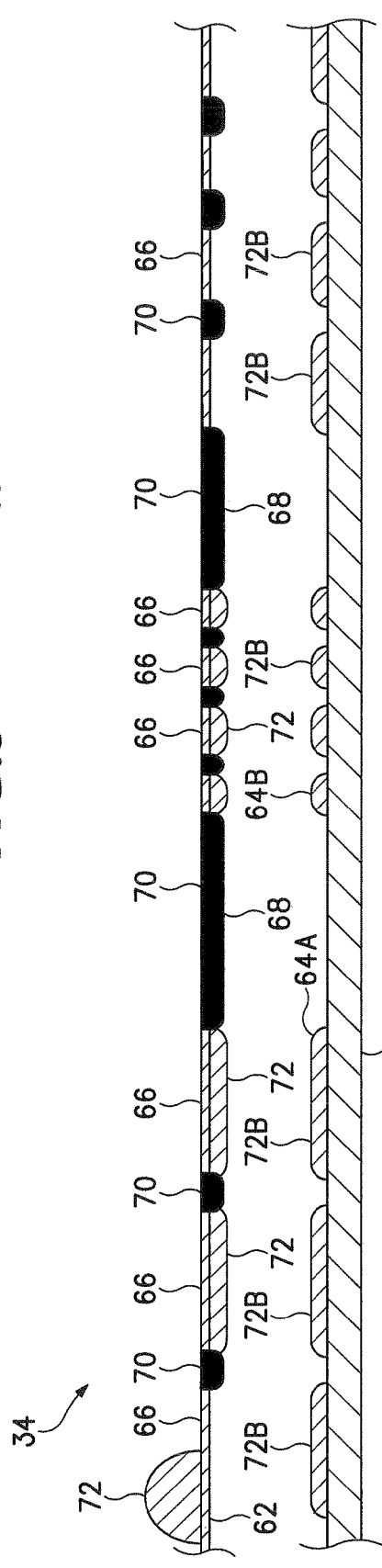

FIG. 6 shows a first stage of the screen printing process. A first screen 62 is used to print a first resin layer 72B on top of the polymeric film 60. A pattern is formed in areas 66 in one example using a photosensitive emulsion 68 that is applied as either a liquid coating or in sheet form. A pattern is applied over the emulsion 68 and the emulsion 68 is then exposed to light. The areas in the emulsion 68 that were covered by the pattern remain soft and are washed out forming open areas 66. The areas 70 not covered by the pattern remain blocked off with emulsion 68.

In a next process, the screen 62 is located over the polymeric film 60 and a resin material 72 is spread over the screen 62. Using a squeegee, the resin 72 is spread through the unblocked areas 66 in screen 62 and onto the top surface of the polymeric film 60 forming resin layer 72B. In one example, the resin material 72 is clear, but other degrees of opaqueness or color can be used.

The size and shape of the individual areas 66 can be relatively consistent or can vary in shape, size or spacing. If the areas 66 have different shapes, then the corresponding bumps 64A and 64B formed in resin layer 72B will also have different shapes. It should be noted that the variable size and shape of the bumps 64A and 64B formed in resin layer 72B help promote the random or semi-random refraction of light as shown above in FIG. 4.

In one example, the same systematic repeating pattern of bumps 64 is repeated for multiple sections of the same window film 34. These bumps can be created in any repeating, random, or semi-random arrangement that refracts light in different directions. This bump pattern can then be used to form visual subpatterns that simulate different textured glass surfaces such as water glass or rippled glass. This is shown in more detail below in FIGS. 12 and 13.

In one embodiment, screen 62 has a thread count in the range of between 65-420 threads per inch and the thickness of the photosensitive emulsion 68 used to coat the screen 62 is anywhere between 1 mil-100 mils. But in the example in FIG. 6, the screen 62 is coated with emulsion 68 to a depth of about 6.0-8.5 mils. The range of 6.0-8.5 mils of emulsion 68 produces a thickness for resin layer 72B of around 1.0-5.5 mils.

In one example, the resin 72 uses acrylated oligomers by weight in a range of about 20-55%, N-Vinyl-2 Pyrrolidone by weight of about 12-25%, and acrylated monomers by weight of about 8-20%. The resin 72 may contain similar elastic and pliability characteristic as the polymeric film 60. This increases the ease in which the window covering 34 can be applied to a window while also increasing durability. Of course this is only one example and other types of resin materials can also be used.

It should be understood that the dimensions and composition of the screen 62, emulsion 68 and resin 72 can all vary and still provide the prismatic effect described above. The specific dimensions and materials used can be changed to created different lighting and application characteristics.

Figure 7:
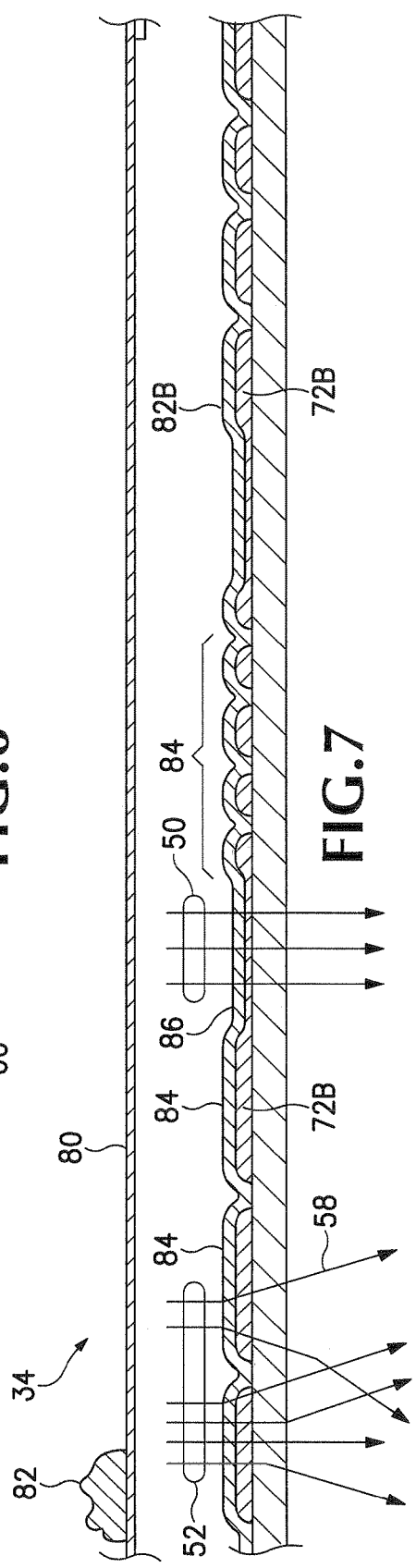

FIG. 7 shows a second screening process that is applied to the textured window film 34. A second screen 80, similar to screen 62 in FIG. 6, is used except that screen 80 does not have a pattern formed from emulsion. In one example, the screen 80 comprises a uniform mesh of between about 110-420 threads per inch and is large enough to cover the entire resin layer 72B. A second resin, clear varnish or clear coat 82 is spread over screen 80 applying a second substantially even resin layer 82B over the first resin layer 72B.

The second resin layer 82B in one embodiment may be less viscous than the first resin layer 72B and may comprise a mixture of TRPGDA by weight in a range of about 20-25%, epoxy acrylate by weight in a range of about 50-56%, HDOCA by weight in a range of about 18-22%, and photoinitiators by weight in a range of about 3-5%. Of course other materials can also be used to form the second resin layer 82B.

The resin layer 82B in one example is clear and produces a "liquid" visual effect similar to that produced in actual clear or semi-clear textured glass. The combination of the first patterned resin layer 72B and the second substantially even thickness resin layer 82B promote the prismatic characteristics on light as described above in FIG. 4. For example, the textured areas 84 refract or bend incoming light 52 so that the refracted outgoing light 58 distorts any viewed images. However, substantially flat areas 86 may create little or no refraction of incoming light 50. The second resin layer 82B can also provide a certain amount of light diffusion that may not be possible using only textured layer 72B.

The textured window film 34 can produce a limitless variety of different visual effects. For example, different textured patterns can be created that simulate different visual effects that exist in actual textured glass. The clear non-colored version of the textured window film 34 can be used in applications where some level of privacy is desired but other fashion characteristics, such as a colored pattern, are not desired.

Color

Another aspect of the invention adds one or more colors to the textured window film. A substantially uniform color can be applied or multiple colors can be applied that have any variety of different patterns. These colored patterns can be used to further simulate different types of colored glass, including stained glass.

FIG. 8 shows one example where an inked layer 90 is applied to a top surface of polymeric film 60. One example uses an offset lithography process to form ink layer 90. However, any other process can also be used to apply an ink layer 90 on the polymeric film 60, such as by using an ink jet printing process or a screen printing process similar to that used for applying the resin layers.

Offset lithography is widely used to produce full color images in mass such as magazines, brochures, posters and books. In the offset lithography example, an image is transferred from a plate wrapped around a cylinder onto the polymeric film 60. The offset lithography process can be used to apply any image, pattern, uniform or non-uniform color, picture, etc. onto the polymeric film 60. The lithography process, breaks down an image into small dots separated into four colors; yellow, magenta, cyan and black known as a four color process. The dots are reproduced onto the printing plate mentioned above. Each color has all the tones necessary to produce a photo quality print in ink layer 90.

In one example, the ink used to form layer 90 is made of an elastic material that has similar elastic characteristics as the polymeric layer 60 and the resin layers 72B and 82B. The elastic characteristics of the ink layer 90 make it more resistant to cracking. It should be understood that the ink layer 90 is optional and other embodiments of the textured window film, such as the textured window film 34 described above in FIGS. 5-7, may not use ink layer 90.

One example of an ink material as described above includes 10-30% by weight Triacrylate Monomer; 10-30% by weight Acrylate Oligomer; 1-5% by weight Hydroxycyclohccyl, 1-,Phenyl Kclone; 1-5% by weight 1-Propanone, 2-methyl-1[4-(methylthio) phenyl]-2-(4-morpholinyl)-; 1-5% by weight Photoinitiator; and 1-5% by weight Pentacrythritol Tetraacrylate made by INX International Ink Co., 651 Bonnie Lane, Elk Grove Village, Ill. 60007.

Another ink material uses Monomeric Multifunctional Acrylates; Multi-Functional Acrylate Ester; Benzophenone; Acrylate Ester of Bisphenol-A-Epoxy; Multifunctional Acrylate; Isopropyl Alcohol; Inorganic filler; and Ketone type photo-initiator. Of course are just examples and other types of ink materials could also be used.

FIG. 9 shows the two resin layers 72B and 82B applied on top ink layer 90. The two resin layers 72B and 82B are applied in the same manner described above in FIGS. 5-7. However, in one alternative embodiment, the textured areas 94 and 96 provided by resin layer 72B may by designed to align with particular colored patterns in ink layer 90.

Figure 10:
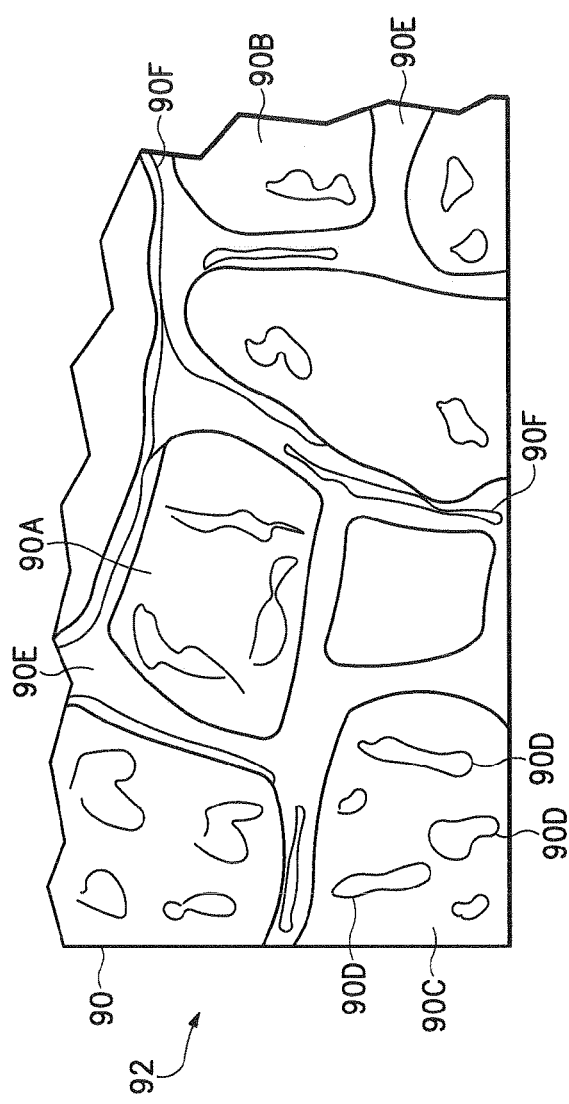
FIG. 10 shows one example of a color design formed in the textured window film.

For example, FIG. 10 shows a stained glass window ink design 92 formed in the inked layer 90 in FIG. 8. In one example, a photograph is taken of an actual stained glass window. The photograph is transferred onto a lithography plate that then transfers the picture of the stained glass window onto the polymeric film 60 as ink layer 90.

In the stained glass window example, a plurality of simulated glass panes in areas 90A, 90B, and 90C have different colors and shapes. For example, area 90A may have a blue glass color, area 90B may have a red glass color, and area 90C may have a green glass color. Of course this is just an example, and any combination of colors and shapes may exist on ink layer 90.

The stained glass colored regions 90A-90C may also have subregions 90D that have different combinations of other colors and shapes with differing degrees of translucence. These colored regions 90D can simulate different imperfections, veins, or variations in shape and coloring inside the primary colored regions 90A-90C.

Other regions 90E may simulate lead or copper extending between the simulated glass regions 90A-90C. In this example, the areas 90E may have a substantially opaque color, such as the grey or black. To further simulate the stained glass visual impression, other locations 90F within the simulated leaded or copper regions 90E may include a lighter, less opaque color, such as a light grey color. The lighter color of areas 90F simulate shading that create a three-dimensional visual impression for the lead or copper frame area 90E.

Referring back to FIG. 9, the textured areas 94 and 96 in resin layer 72B may be aligned with the simulated glass areas 90A-90C shown in FIG. 10. The prismatic effect provided by the textured areas 94 and 96 in combination with the colors provided by area 90A-90C in ink layer 90 combine to enhance the simulated visual impression of stained glass. For example, the refracted light sparkles off the surfaces in areas 94 and 96 simulating a crystal glass type visual effect.

In one example, area 94 of resin layer 72B may be designed to have larger or different shaped bumps than the bumps provided in area 96. The larger bumps in area 94 can be aligned with a particular colored glass area, such as area 90A while the smaller bumps in area 96 can be aligned with other colored areas, such as area 90B in FIG. 10. This creates different prismatic refraction characteristics for areas 90A and 90B simulating two different colors of stained glass with different textures.

In another embodiment, the substantially flat areas 98 in the resin layer 72B may be aligned with the simulated lead or copper areas 90E shown in FIG. 10. This has the further unique visual effect of further varying the prismatic effect for the different corresponding glass areas 90A-90C while also providing a substantially opaque non-refracted light effect for the simulated leaded or copper areas 90E.

Figure 11:
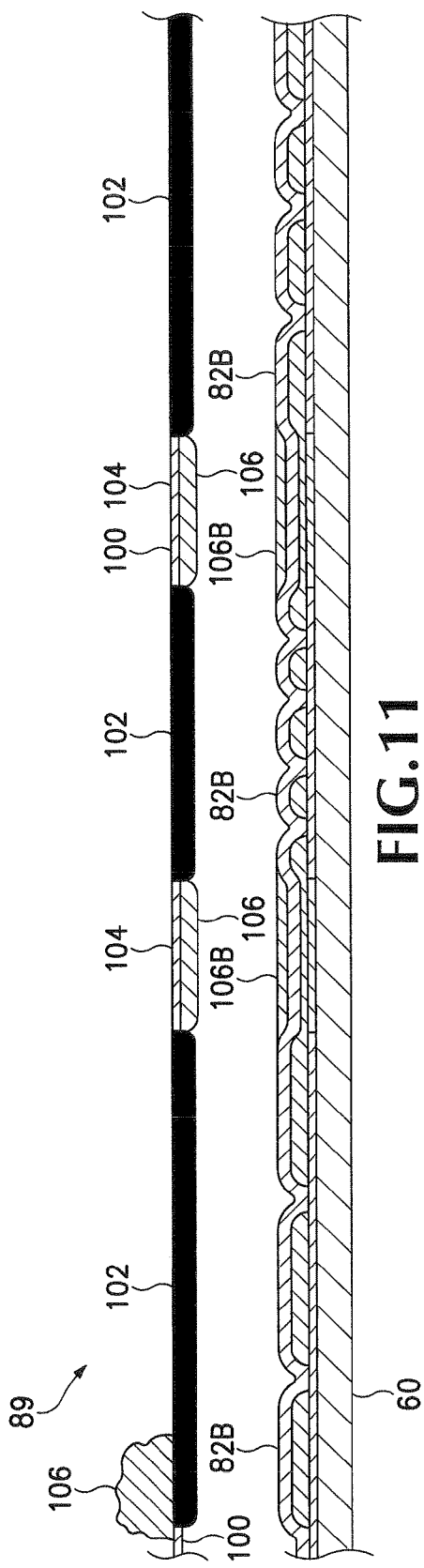
FIG. 11 shows an optional screen printing stage used for the design shown in FIG. 10.

FIG. 11 shows a third screen 100 used for forming another layer 106B on top of resin layer 82B. A photo-sensitive emulsion process is used on screen 100 in a manner similar to that described above in FIG. 6. Emulsion 106 is applied to the screen 100 and a pattern placed over the emulsion 106. The photo-exposed areas of the emulsion block areas 102 of the screen 100 while the emulsion is washed away from the other non-exposed areas 104.

A resin or varnish 106 is spread over screen 100 loading up underneath unblocked screen areas 104 and then depositing as a third layer 106B on top of the second resin layer 82B. In this example, the open screen areas 104 align with the leaded or copper colored areas 90E in FIG. 10. The resin layer 106B in this example has a matte finish that enhances the lead or copper appearance of color areas 90E. Resin layer 106B also serves to fill in some of the recessed areas between the textured areas.

The screen 100 in one example comprises a 380 thread per inch mesh twill weave that forms an emulsion thickness of around 2 mils. However, other mesh thread counts and emulsion thicknesses can be also used.

Figure 12:
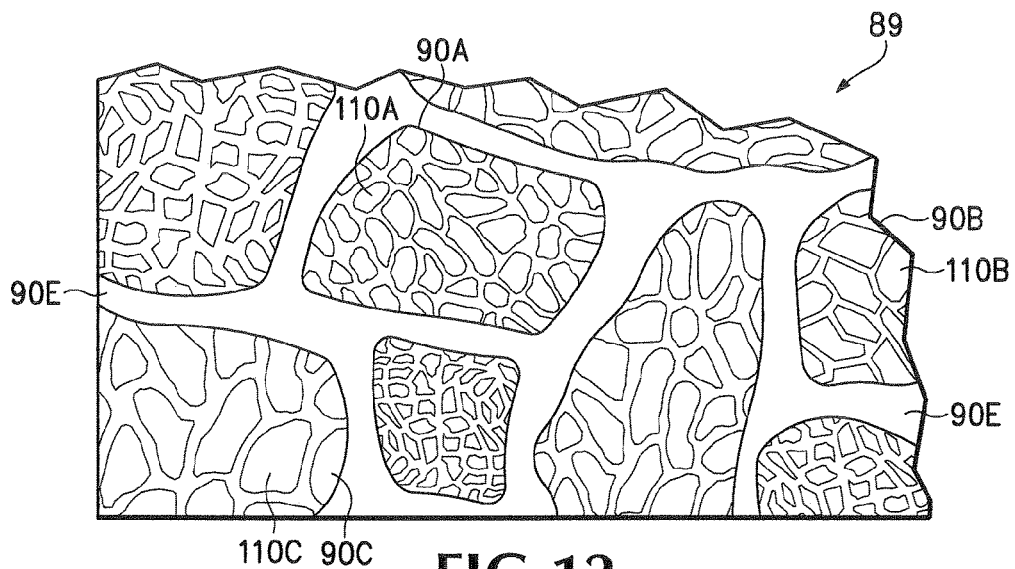
FIG. 12 is a top plan view showing different textures applied to different colored areas of the design shown in FIG. 10.

FIG. 12 is a top plan view showing examples of different textured surfaces that can be produced for the stained glass version of the textured window film 89 shown in FIGS. 8-11 or for the clear or translucent non-colored textured window film shown in FIGS. 3-7. In this example, areas 90A, 90B and 90C have different sizes and shapes of textured bumps 110A-110C, respectively, that each may produce different prismatic refraction effects. The simulated leaded areas 90E have a substantially flat non-textured surface.

In a first pattern forming stage, the shapes of a number of individual textured bumps 110A-110C are designed. A second pattern forming stage may then systematically, semi-randomly, or randomly repeat one or more of these different small sub-patterns of bumps. For example, the same or different patterns for small groups of individual bumps 110A, 110B and/or 110C may be systematically repeated to form the primary stained glass pattern areas 90A-90C. In another example, the glass pattern areas 90A-90C may all be formed from the same sub-pattern of bumps. The final primary pattern shown in FIG. 12 formed from one or more repeated sub-patterns of bumps is then applied to the screen 62 (FIG. 6) using the emulsion pattern process described above.

The repeating sub-patterns and primary patterns on the polymeric film allow multiple sheets of the polymeric film to be seamlessly tiled together. In other words, the repeating textured pattern allow multiple sheets of the film to be attached adjacent to each other to create one continuous textured pattern formed over multiple polymeric sheets.

Figure 13:
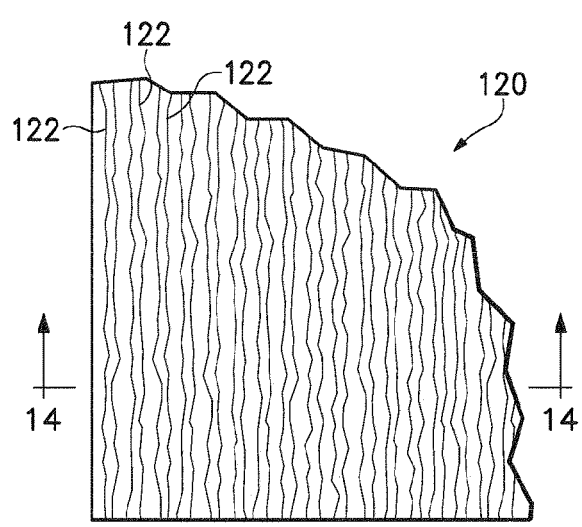
FIGS. 13 and 14 show another texture design for the textured window film.
Figure 14:
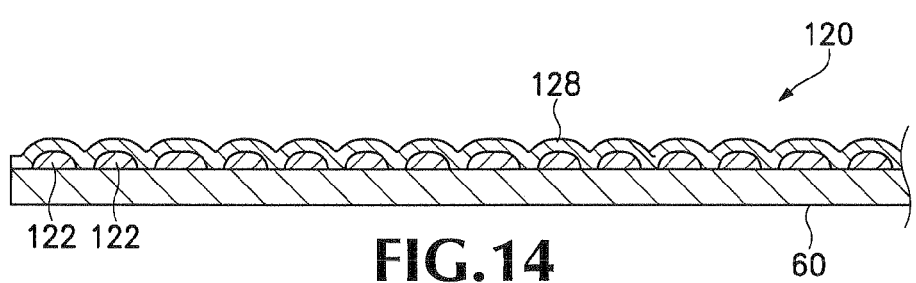

FIGS. 13 and 14 show another example of a textured window film 120 made in much the same fashion as textured window film 34 shown in FIGS. 5-7. In this example, there is no ink layer 90 applied on top of the polymeric film 60. A first clear resin layer 122 is deposited on film 60. The resin layer 122 forms elongated rows or ripples that extend along the entire length of the textured window film 120. A second clear coat layer 128 of substantially uniform thickness is formed over the resin layer 122 similar to resin layer 82B in FIG. 6.

The following summarizes design parameters used for some specific textured window films.

| Style | | Mesh | Emulsion |
| --- | --- | --- | --- |
| Color/clear line 120 | Textured Layer 122 | 86 | 8 mils |
| | Second Layer 128 | 195 | 2 mils |
| Mosaic 89 | Textured Layer 72B | 110 | 6.5 mils |
| | Second Layer 82B | 305 | 2.0 mils |
| | Lead line Layer 106B | 390 | 2.0 mils |
| Cross Hatch | Textured Layer 72B | 110 | 6.5 mils |
| | Second Layer 82B | 195 | 2.0 mils |

The mesh values refer to a number of threads per square inch. The emulsion values refers to the thickness of emulsion applied to the screen. For example, the thickness of emulsion 68 in FIG. 6 used to form the textured layer 72B for the mosaic design is around 6.5 mils. The thickness of the emulsion varies the thickness of the resin layer applied over the openings in the emulsion. Thus, the thicker the emulsion, the thicker the following resin layer.

The processes described above are only examples of a combination of textures that are created on the polymeric film. It should also be understood that limitless combinations of screens, emulsion and resin materials can be used to create any of these different textured surfaces. For example, the different patterns on the screen meshes, the thread counts (mesh count) on the screen meshes and the thickness of the emulsions and resins applied to the screens can all be varied to create different textured patterns and different thicknesses and shapes of the resin forming the individual bumps in the textured surface.

A screen with a lower thread count per inch produces a coarser mesh that allows more of the resin to pass through onto the polymeric substrate. This can produce different shapes and heights of the bumps produced on the textured surface. These different bump heights in combination with the textured surface pattern and any ink pattern applied during the process can create a limitless combination of prismatic characteristics in the window covering that result is different lighting and visual effects.

It should also be understood that any combination of opaqueness, textured designs and colors can be used in the textured window films to provide any desired combination of visual effects. For example, the polymeric film 60, ink layer 90, resin layer 72B or 122, resin layer 82B or 128, and resin layer 106B may have any combination of different degrees of opaqueness to provide more or less reflection, diffusion, and refraction.

Installation

Another advantage of the process described above is the ease that the textured window film can be applied to and removed from a window. For example, the smooth/flat contact surface 36 (FIG. 1) in combination with the polymeric material used for the substrate 60 allows the window film to be applied without the use of adhesive materials. The window film is held to the window surface by cohesion and atmospheric pressure. While this is one embodiment, other embodiments of the textured window covering can apply an adhesive material to the window contact surface.

In one embodiment, a paper or polyester liner (not shown) is applied to the smooth side 36 of the polymeric film 60 so that it can be rolled and packaged for commercial sale. The paper liner is held to the polymeric film by the same cohesion and atmospheric pressure that is used to hold the window film to a window.

The liner used with the textured window coverings is easier to remove from the back of the polymeric film than the liners used with other window films. Other window films include a backing that has to be removed from the film using water, razor blades, tape, or some other prepatory procedures. To install the textured window film, the paper is simply pealed off the flat surface of the polymeric film 60 and the film pressed against a wet or dry glass surface. No additional surface preparation is generally required however in one embodiment soapy water is applied to the window film surface or to the window during application to reduce air bubbles. The textured window covering can be easily cut using scissors or a knife to create any desired shape.

The textured window film in one embodiment is thicker than conventional widow films. This makes the textured window film more resilient to bending and creasing and in general makes the material easier to work with. The polymeric substrate and resin layers in combination with any applied ink also have a flexible and stretchable characteristic that further prevent the film from cracking and otherwise being damaged during application or removal from a window. The materials described above for forming the textured window film also do not require any special cleaning process. Thus, conventional window cleaners can be used for cleaning the window film.

In one embodiment, the ink and texture designs used in the window film allow separate sheets to be tiled together. For example, the texture design, ink design, or a combination of both, is generated with a repeating pattern so that two sheets of the same pattern can be attached to the same window adjacent to one another and produce a continuous seamless visual effect.

Ultra-Violet (UV) inhibitors can be applied to any portion of the manufacturing process. For example, UV inhibitors can be applied in the polymeric substrate, or can be added to any of the resin layers or ink layer applied to the substrate.

Scent

A scent can be mixed with the top layer of the textured window film. For example, in FIG. 7, the resin 82 can be mixed with a fragrance to provide a pleasing aromatic effect to the textured window film 34. The scent in one example makes up 0.5%-3% of the weight of the resign 82. The scent is inert so that it does not effect the chemical composition of the resin 82.

The resin 82 is applied over the first resin layer 72B in the same manner described above in FIG. 7.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A window covering, comprising:
  a unitary piece of film configured for attaching to a window in a wall or opening in a building structure and further configured for distorting images when viewed from an opposite side of the window;
  the film having a separate discontinuous systematic ordered repeating patterned layer printed with a screen printing process onto a top surface of the film, the screen printing process also blocking the patterned layer from being printed onto other uncovered areas of the top surface of the film leaving those uncovered areas substantially flat and uncovered by the patterned layer;
  the patterned layer comprising multiple elongated bumps that together form a repeated printed sub-pattern of continuous raised ribs that extend continuously over substantial portions of the top surface film and wherein all of the elongated bumps that together form the raised ribs are each printed directly onto the top surface of the film;
  wherein the continuous raised ribs formed by the elongated bumps are unevenly spaced apart from adjacent ribs by uncovered asymmetrical flat areas of the top surface of the film that are not covered by the patterned layer; and
  wherein the continuous raised ribs formed by the patterned layer create surface discontinuities on the top surface of the film that form a textured surface over a substantial portion of the film thereby producing a prismatic effect that primarily allows light to pass through the film but in an uneven and non-uniform non-diffusing manner at refracted random or semi-random angles that distort the viewed images.

2. The window covering according to claim 1 wherein the film includes a polymeric substrate having a first substantially flat bottom surface that attaches directly to the window without adhesives using cohesion and atmospheric pressure.

3. The window covering according to claim 1 including a second layer having a substantially uniform thickness extending over the discontinuous layer.

4. The window covering according to claim 1 wherein different groups of bumps are formed into different sub-patterns on the surface of the top surface of the film.

5. The window covering according to claim 1 wherein the different groups of bumps have different sizes and shapes so that each of the different groups of bumps create different visual surface effects on the top surface of the film.

6. The window covering according to claim 3 including a third layer having a substantially uniform thickness that is located on top of the second layer over flat non-textured areas of the discontinuous layer.

7. The window covering of claim 1 including an ink layer.

8. The window covering of claim 7 wherein the ink layer includes multiple different colored areas each having different design shapes that corresponding with different textured pattern shapes on the textured surface.

9. The window covering according to claim 8 including other colored areas in the ink layer aligned with substantially flat areas in the textured surface.

10. The window covering according to claim 5 wherein the bumps are between 0.5-5.0 mils thick.

11. The window covering according to claim 5 wherein the discontinuous layer forming the bumps maintains substantially flat uncovered areas on the film in between the bumps that allow light to pass directly through the film but that have smaller surface areas than surface areas formed by the bumps so that the flat areas in-between the bumps prevent undistorted viewing of images though the film.

12. The window covering according to claim 5 wherein the film comprises a clear plastic material and the discontinuous layer applied to the top surface of the film is a clear resin layer that distorts viewed images due to an irregular three-dimensional top surface of the film created by the bumps formed by the clear resin layer that, while allowing light to pass through the film and the resin layer, also refract the light at random or semi-random angles.

* * * * *

UNITED STATES PATENT AND TRADEMARK OFFICE
CERTIFICATE OF CORRECTION

PATENT NO. : 7,468,203 B2  Page 1 of 1
APPLICATION NO. : 10/846904
DATED : December 23, 2008
INVENTOR(S) : Thomas Hicks It is certified that error appears in the above-identified patent and that said Letters Patent is hereby corrected as shown below:

At Column 10, Line 63, in Claim 2, delete "fiat" and insert -- flat --, therefor.

Signed and Sealed this

Sixteenth Day of February, 2010

David J. Kappos
*Director of the United States Patent and Trademark Office*